R. E. OLSEN.
VEHICLE SPRING.
APPLICATION FILED MAY 11, 1914.

1,146,273.

Patented July 13, 1915.

WITNESSES:
F. C. Matheny
O. Johnson

INVENTOR
Robert E. Olsen
BY
C. D. Haskins
ATTORNEY

UNITED STATES PATENT OFFICE.

ROBERT E. OLSEN, OF SEATTLE, WASHINGTON.

VEHICLE-SPRING.

1,146,273. Specification of Letters Patent. Patented July 13, 1915.

Application filed May 11, 1914. Serial No. 837,611.

*To all whom it may concern:*

Be it known that I, ROBERT E. OLSEN, citizen of the United States, residing at Seattle, in the county of King and State of Washington, have invented a certain new and useful Improvement in Vehicle-Springs, of which the following is a specification.

My invention relates to improvements in vehicles, such as automobiles, carriages and the like, and more particularly it relates to improvements in means for yieldingly supporting the body of a vehicle upon the frame of the running gear thereof, and the object of my invention is to provide a vehicle, as, for instance, an automobile, wherein its body shall be supported above the running gear by springs and other associated parts of such form and construction as will adapt them to absorb the shock due to violent vertical movements of the wheels of such vehicle in its travel over rough and uneven roadways, thus to prevent any bouncing that may be disagreeable to an occupant of such vehicle. I accomplish this object by devices illustrated in the accompanying drawings in which—

Figure 1:
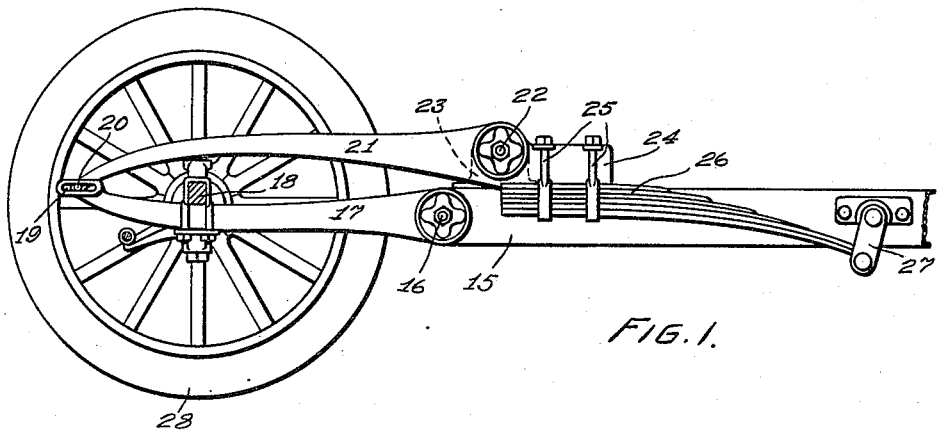
Figure 2:
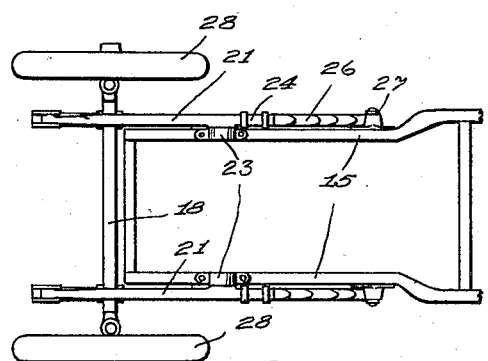

Figure 1 illustrates a form of the device when applied to the front end of an automobile chassis; and Fig. 2 is a plan view on a reduced scale of devices shown in Fig. 1.

In Fig. 1, 15 is the front end of an automobile chassis that is articulated by a pivot 16 with the end of an extension member 17 which extension member 17 is secured to an axle 18 to project forwardly therefrom, the front end of such extension member 17 being provided with a slot 19 within which a pin 20, that is provided in the front end of a lever arm 21, is adapted to slide, such lever arm 21 extending backwardly above the extension member 17 and there secured by a pivot 22 to a bracket 23 that is fastened to the chassis 15 at a point slightly to the rear of the pivot 16 and such lever arm 21 has an end 24 that projects past the pivot 22 and rigidly secured by bolts 25 to a spring 26, which spring 26 is articulated with the chassis 15 by a link 27.

Wheels 28 are secured in a suitable manner to the axle 18 and if such wheels 28 encounter a hump in the surface over which they travel and are bumped upwardly the outer end of the extension member 17 and the outer end of the lever arm 21 will be moved upwardly thus tending to lift the chassis 15 but as such extension member 17 and lever arm 21 move upwardly the spring 26 will be deflected and will exert a downward pressure on the chassis 15 at a point where such spring is connected with such chassis 15 by the link 27 thus permitting the extension member 17 and the lever arm 21 to turn about the pivot points 16 and 22 respectively while the wheel 28 will pass over the hump without lifting the chassis 15 perceptibly.

Manifestly in the operation of a vehicle embodying my invention any abrupt upward movement of any of the wheels will exert a downwardly directed force upon the body of such vehicle which force will tend to prevent such body from bouncing upwardly.

Obviously many changes in the details of my spring suspension may be made without departing from the spirit of my invention or sacrificing any of its advantages.

What I claim is:—

1. In a vehicle of the class described, the combination with the chassis and axle of a vehicle of an extension member fixedly secured to said axle and pivoted to said chassis, said extension member having an end that projects forwardly from said axle, a bracket provided on said chassis, a lever arm articulated with said bracket, said lever arm being movably secured to the forward end of extension member, a spring secured to the rear end of said lever arm, and a link connecting the free end of said spring with said chassis whereby relative movement between said axle and said chassis will deflect said spring.

2. The combination with the chassis and axle of a vehicle, of an extension member pivoted to said chassis and fixed intermediate its ends to said axle, a lever arm pivoted to said chassis and to the forward end of the extension member, and a leaf spring fixed at one end to said lever and at its other end loosely-connected to said chassis.

In witness whereof, I hereunto subscribe my name this 25th day of April A. D., 1914.

ROBERT E. OLSEN.

Witnesses:
FRANK WARREN,
O. JOHNSON.

Copies of this patent may be obtained for five cents each, by addressing the "Commissioner of Patents, Washington, D. C."